July 20, 1954　　　W. D. MACGEORGE　　　2,684,203
ELECTRONIC INPUT CONTROLLER
Filed Aug. 25, 1949　　　　　　　　　　　　　3 Sheets-Sheet 3
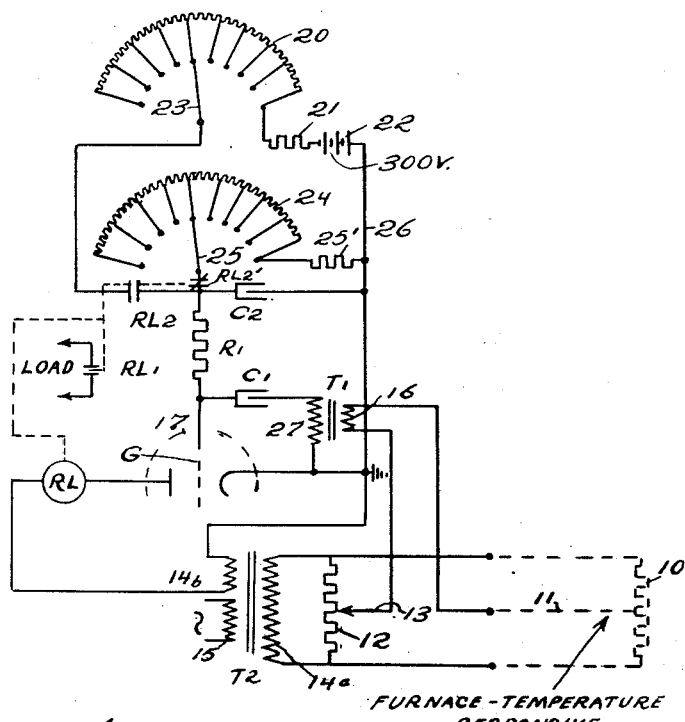
INVENTOR
WILLIAM D. MACGEORGE
BY
Barr, Borden & Fox
ATTORNEY Patented July 20, 1954

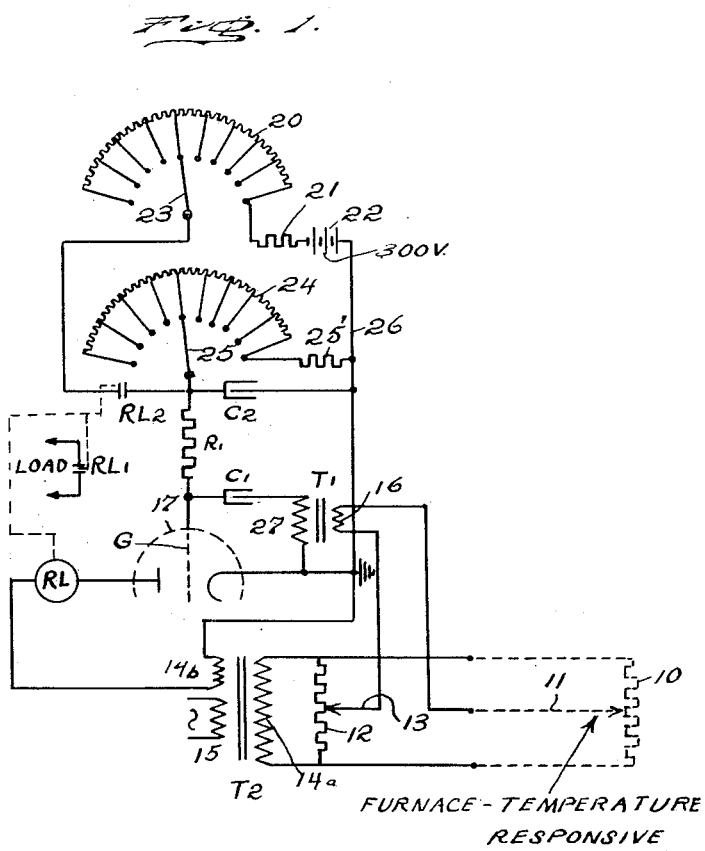

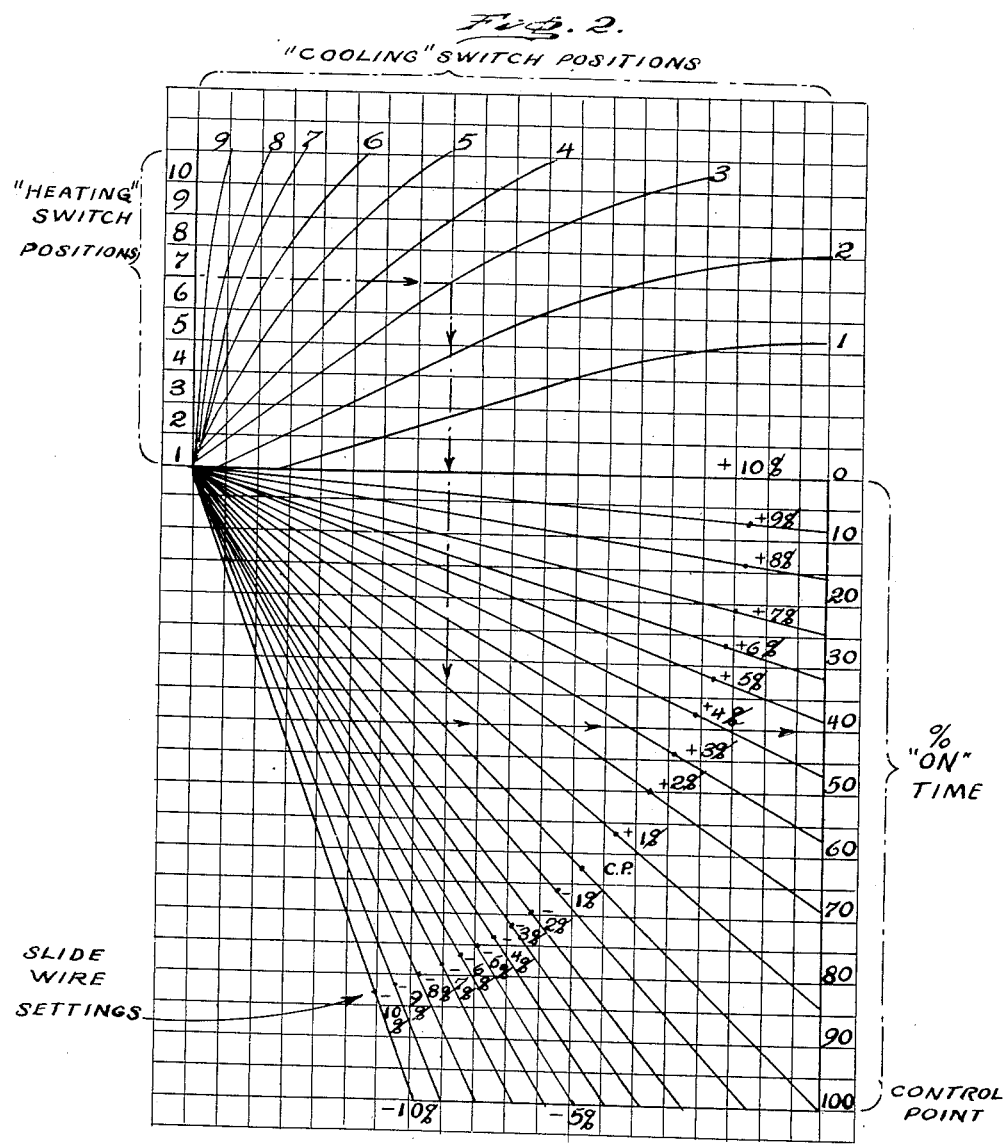

2,684,203

UNITED STATES PATENT OFFICE 2,684,203

ELECTRONIC INPUT CONTROLLER

William D. Macgeorge, Havertown, Pa., assignor to Automatic Temperature Control Co., Inc., Philadelphia, Pa., a corporation of Pennsylvania Application August 25, 1949, Serial No. 112,330

12 Claims. (Cl. 236—15)

This invention relates to input controllers, pertaining particularly to electronic devices for controlling and proportioning the duration of power "on" to power "off" in a complete repeat cycle of power controlling functions.

Input controllers are essential in the operation of electric furnaces, but as previously provided in commercial forms they have been unduly expensive, erratic, subject to fairly rapid wear, included pluralities of relatively moving parts, and, in the main, were manually controlled and were not responsive automatically to the actual conditions in the furnace for varying the cycle of controlling functions.

It is among the objects of this invention: to improve input controllers; to provide a simplified completely accurate input controller of cheap production and maintenance costs and of wide flexibility of control; to provide in input controllers variable charging and bleed discharging rates of a controlling condenser as the timing agency thereof; to provide an input controller incorporating a single movable relay element; to provide an electronic input controller for operative association with a furnace by which manually the timing functions can be established and varied with means for automatically varying the timing functions in accordance with actual furnace conditions; to provide an input controller giving effective proportional type action using only cycling on-off control, by varying the time on during each cycle; to provide a proportional input control in which the proportional band is automatically varied for varying loads; to provide a proportioning input control in which the proportional band is increased automatically for decreased loads, while being automatically decreased for increased loads; to provide a proportioning input control in which the width of the proportional band varies inversely with the load; to provide an input control arranged for operative association with a recording temperature potentiometer or like temperature-responsive slide wire agency; to provide an input controller and a proportioning controller of the temperature-responsive slide wire resistor type by which a substantially straight line control is secured without apparent cycling on the chart and with an actual control band always less than the band of the proportional resistor in the instrument; to provide an input control by which "over-shoot" in bringing a furnace up to heat is substantially precluded; to provide an input control of excellent stability, substantially immune to changes in operating efficiency arising from vibration, gradual changes in line voltage, humidity, or from moderate external strays; to provide an input controller for controlling loads cyclically on and off in repeat cycles for controlling the temperature of furnaces, including furnaces that are electrically energized as well as those which rely upon the combustion of fuel for the desired temperature effects; to provide an input controller for controlling valves in fuel lines with substantially off and on valve settings to secure "burst" firing of such furnaces; and many other objects and advantages will become more apparent as the description proceeds.

In the accompanying drawings:

Fig. 1 represents a schematic wiring diagram illustrating the input controller of this invention in a preferred exemplification.

Fig. 2 is a diagram showing the operating curves of the input controller in various relatively adjusted control situations.

Fig. 3 represents a fragmentary schematic wiring diagram of a modified form of the input controller of this invention.

Fig. 4 represents a schematic diagram of a furnace and a millivoltmeter controller for operative association with the diagrammatic circuits of Figs. 1 and 3.

In an illustrative simplified exemplification of the invention a bridge circuit is established comprised of side legs to which a slide wire 10 is connected, the relatively movable arm 11 of which is adjustable automatically, in any desired manner, as by furnace pyrometer output control, as a function of the deviation of temperature of the furnace to be controlled. Elements 10 and 11 and connections therefor may be located at any desired point, say, adjacent to the furnace either remote from or adjacent to the control panel mounting the remainder of the instrument, according to the instant situation. When the furnace is cold, the pointer 11 is at a maximum spacing from the central holding condition, if this happens to have been selected, toward the "cold" side. If the input is out of balance with the actual demand, it is possible for the pointer or arm 11 to deviate from such central holding point toward the "hot" side. The desired object of the instrument is to hold the arm 11 at or close to the selected holding point, whether this is a central point, or as will be pointed out as preferred, a point asymmetrical of the slide wire 10. It is usual and it is preferred to associate a "pyrometer pen" with arm 11, by which to record the temperature conditions of the instant furnace against time.

The bridge circuit is completed by the slide wire 12, connected to the side legs of the circuit, and the manually adjustable pointer or arm 13 therefor. The latter is provided with a suitable "control index" relative to which the arm 13 is manually adjusted in establishing the balance level of the bridge. The bridge circuit is energized by the secondary coil 14a, parallel slide wire 12, and energized by the primary 15 of the transformer $T_2$. It will be seen that by adjustments of arm 13 the movement of pyrometer control arm 11 toward and away from bridge balance can be caused to occur almost completely on one side, say, the "cold" side of the pyrometer slide wire control point. The slide arms or pointers 11 and 13 are connected through the primary coil 16 of the control transformer $T_1$. With balance in the bridge circuit no current flows in the primary coil 16 of the transformer $T_1$, while a current will flow through this primary in one phase or the opposite phase depending upon the direction or sense of the unbalance of the bridge. The transformer $T_1$ includes a secondary 27.

A controlling thermionic tube 17 is provided, in the output plate circuit of which there is disposed a relay RL of the multi-pole type. Relay RL includes normally open switch $RL_1$ and normally open switch $RL_2$, which are both pulled "in" when the relay is pulled "in" by current flowing through the tube. It will be understood that by suitable transformer means 14b the plate circuit will be energized by voltage of the order of 300 volts A. C.

The normally open switch $RL_1$ is disposed between the power supply and the load, i. e. the furnace, so as to feed power directly to the furnace during the timed interval "on" to be discussed.

A "heating" rheostat or series resistor 20 is provided connected at one side through a resistance 21 to the negative side of the D. C. source 22. Illustratively, this may comprise rectified A. C. or a 300 volt battery 22. The resistance in the operative portion of the rheostat 20 is controlled by the manually adjustable wiping arm or pointer 23. A "cooling" rheostat or shunt resistor 24 is provided, connected at one side through a resistance 25' to the positive side of the D. C. source 22. The other side of the cooling rheostat 24 is determined by the position of the manually controlled wiping arm 25, connected through normally open relay controlled switch $RL_2$, to the wiping arm 23 of the heating rheostat. A timing condenser $C_2$ is connected between the wiping arm 25 and a line 26 extending from the positive side of the D. C. source 22, across the end of resistance 25', to ground with the terminal of the cathode filament of the tube 17. The secondary coil 27 of the transformer $T_1$ connects between the cathode of the tube on one side and one side of the isolating condenser $C_1$. The grid G of the tube 17 connects with the opposite side of the condenser $C_1$ through resistance $R_1$ to the wiping arm 25 of the "cooling" rheostat 24 and its connections. It will be seen that the grid G of the tube 17 is susceptible to the impressing thereon of a negative grid bias of varying voltage from the D. C. source of the general order of from 100 to 150 volts, as well as from the alternations of A. C. passing through transformer $T_1$ in one phase relation thereof responsive to one sense of unbalance of the bridge.

While it will be understood that suitable filter condensers and the like will be used throughout the circuit wherever they may profitably be used, the schematic wiring diagram disclosed contains the bare essentials of the operative circuit of the input controller of this invention.

In the operation of the device let it be assumed that, instantaneously, the slide wire bridge circuit is balanced and therefor transformer $T_1$ is placing zero A. C. signal on the grid G of tube 17. The portion of the operating cycle effective at this juncture finds the negative charge on the timing condenser $C_2$ progressively diminishing as the charge thereof bleeds off through the "cooling" resistor 24. This negative grid bias decreases until it attains a value of approximately —2 volts, at which juncture the tube 17 will conduct sufficiently to pull "in" relay RL. Energization of the relay, as noted pulls "in" the normally open load circuit contact or contacts $RL_1$, and the power input to the furnace begins. Simultaneously the relay RL closes the normally open contact $RL_2$, thus connecting an illustrative 300 volt negative source to the "heating" resistor 20 and then to the timing condenser $C_2$ which begins to charge negative. The rate of negative charging of the timing condenser $C_2$ is determined by the settings of the respective wiping elements 25 and 23 relative to their respective resistances 24 and 20. In other words, in this illustrative form the bleed rate and the basic charging rate through resistor 20 effect a resultant condenser charging rate of the said order of from 100 volts to 150 volts. Of course, change of setting of either arm 23 on resistor 20 or arm 25 on resistor 24 changes the resultant charging rate of condenser $C_2$. Conversely, the rate of bleed discharge is determined solely by the setting of wiping arm 25 relative to the cooling resistance 24. By suitable settings of the variable resistors the relative time of charging can be proportioned to the relative time of discharging, in any desired time relation.

It may be assumed that the negative charging of the condenser has started, which negative charge is impressed on the grid G of the tube 17. When the amplitude of negative charge on the condenser $C_2$, and on the grid, approximates —8 volts, the tube will stop conducting and the relay RL will drop out, opening the line of power to the furnace through $RL_1$, as well as the flow through switch $RL_2$ previously connecting the negative side of the D. C. source to the condenser $C_2$. The condenser $C_2$ bleeds through the shunt resistor 24 at the rate determined by the setting of arm 25 on resistor 24 and resistance 25' until the charge on the condenser $C_2$ has reached approximately —2 volts, at which the tube 17 again starts to conduct. This series of cyclic timing operations thus induced or controlled will maintain in alternating sequence indefinitely as long as the two controls 23 and 25 remain unchanged and there is no A. C. signal from the bridge circuit.

Let it be assumed that at any desired point of the just described complete timing cycle the instrument slide wire 11 is displaced toward the "cold" side, and the unbalance of the bridge causes an A. C. input on grid G, say, momentarily or instantaneously, of the order of 10 volts, in the proper phase relation as to cause the tube to conduct. The tube 17 will then conduct, pulling in the relay RL, which will pull in the switch $RL_2$ starting the application of negative voltage to the condenser $C_2$, as well as closing the load circuit. When this negative charge on the grid G overbalances the A. C. voltage signal by approximately 8 volts, the tube ceases to conduct, the relay and its switches drop out, the load circuit goes "off" and the connection from the negative side of the D. C. source to the condenser C₂ is broken, and the condenser C₂ will discharge through shunt resistor 24.

It is a feature of novelty and of importance in the invention that whenever a disturbance in slide wire arm 11 position occurs, by reason of a change in furnace condition, an immediate relay action is initiated, and this action continues for a length of time more or less proportional to the magnitude of the disturbance. This constitutes the circuit as a proportional control. In the instance given, with a deviation of greater magnitude, so that the A. C. input is of the order of 12 volts, it would take a correspondingly longer time for the negative charge from the battery to be effective on the grid to stop the tube conduction. Of course, the power voltage input to the furnace continues as long as the tube conducts and the relay is pulled in.

After the proportional control has been completed, the condenser C₂ bleeds down through shunt resistor 24 at a known rate, gradually removing the bias which has caused the tube to stop conducting and the relay to drop out. If the original disturbance has subsided by this time (due to the corrective load action or other causes) the voltage across C₂ will return to its original value and the old cycle will be resumed, constituting "reset" of the instrument. However, if the disturbance is still all or partially present a new cycle will be initiated which will eventually overcome the disturbance and return the system to its normal predetermined operation and the pre-set timing cycles. It will be understood that as the plate and cathode are energized by the same source of A. C. as feeds the bridge, the tube will not conduct except when the plate and grid are both positive at the same instant, as when the bridge unbalances toward the "cold" side.

Movement of the slide wire arm 11 on slide wire 10 to the "hot" side, however, develops a signal of the opposite phase from the signal from the "cold" side movement, which will add instantaneously negative A. C. bias to the already existing D. C. bias on the grid G, and the tube will fail to conduct. This is for the reason that the pulsing action stops as the bias on G is always too great to allow the tube to conduct. Therefore, as the input (pulsing) action can only occur when the slide wire is in the "cold" section, effective use can only be made of approximately one half of the slide wire 10 for control purposes. In order that the pyrometer pen (not shown) and the control index (not shown) associated with the instrument can coincide, a "control setting" is provided, comprised of the adjustable wiping arm 13 arranged for manipulation so as to offset the bridge so that the active section of the slide wire will actually be its center.

The curves shown in Fig. 2 give an approximate idea of the relationship existing between the setting of "cooling" shunt resistor 24 and arm 25, the "heating" resistor 20 and its arm 23, and control slide wire 12 and its arm 13, and the relay "on" time. In the average installation after lining out the furnace, it is desirable that the "on" time be approximately 40% of the total time of the cycle regardless of total cycle time. Thus, the timing can be set so that the charging rate of the condenser will be −7, while the discharge rate will be −3. Or the charging rate will be −9, and the discharge rate will be −4. The adjustment of the wiping arms relative to their respective resistors toward the free ends thereof gives the longest over-all cycle time, and conversely, the closer the arms are adjusted to the discharge ends of the respective resistors, the shorter the over-all cycle time. In practice the instrument at the control point can be varied between 5 and 30 seconds, but may be several minutes long "off" control.

While the description has been written primarily from the standpoint of use of an electric furnace, in which connection it is highly useful, it is a feature of the invention that the switch RL₁ can not only control the input of electric power into an electric furnace as the "load" which is controlled, but it can also be used to control the opening and closing, (usually the snap open and snap shut operation) of a valve as a solenoid operated valve in a fuel supply line or in an air supply duct for a burner, or in any other desired manner to regulate the temperature of a furnace.

In the illustrative exemplification of the invention it will be understood as preferred that in the proportional use of the instrument a narrow band of proportionality is all that is used in a wider total band. Where in certain types of controls, the narrow band of proportionality would comprise 10% of the entire band; with the instant invention, however, owing to the fact that one-half of the band is useless, i. e. when the bridge unbalance is by movement of the slide wire 11 toward the "hot" side, the actual operating proportional band is perhaps a mere 5% of the entire range or band width.

It is a feature of importance in the invention that with increases in furnace load the selected narrow range of proportionality decreases in width, when high accuracy is important, to hold the heavier bands closer to the set point than when it is operative at low percentages of time on. With decreased furnace loads the proportionality band will automatically increase in width, when the required accuracy is not of as high a level. These automatic changes in proportioning band width occur simultaneously with automatic changes in time "on" in the cycling of the instrument, i. e. the band narrows as load increases and as time "on" increases, and vice versa. For a given load change the change in percentage time on is much greater on the steep slope of the curve of time on at the high time on values. The change in time on for a given displacement, however, is a measure of the width of the proportionality band, in that the greater the change of a given displacement, the smaller the proportional band. This sharp proportional band change at the higher time on values produces both closer control and less offset at those values.

It will be seen by the invention herein that proportional control of high accuracy and ready automatic functioning can be very economically secured with results equal to or superior to any other known more complicated assemblies.

The simplicity, economy and flexibility of the invention will be obvious, as will the advantages of a single relay part with two switches controlled thereby as the only moving parts.

It will be apparent from the preceding description that the charging rate of the timing condenser is a subtractive resultant of the input through the heating resistor, and the bleed rate through the cooling resistor. This is not only perfectly satisfactory for normal purposes, in most cases it is preferred. However, it will be apparent that the charging rates and bleed rates can be completely independent of each other, with an approximation of the same efficiency as in the preferred form described. Thus, referring to Fig. 3, a modified form of the the invention is disclosed in a wiring diagram which is identical with and bears the same reference characters as that of Fig. 1, except in the addition of a normally closed switch RL₂', operated by the relay RL. Switch RL₂' pulls out or opens synchronously with the pulling in of the relay RL and the associated switches RL₂ and RL₁, previously described. The normally closed switch RL₂' is interposed between the pivoted end of the wiping arm or pointer 25 and the line from the normally open switch RL₂ to the capacitor C₂. When switch RL₂ is closed, switch RL₂' is open and the charging of the capacitor C₂ from the D. C. source begins, without any simultaneous bleed from the condenser. When the relay drops out, for the reasons discussed above, the line from the D. C. source opens and the line from the capacitor through the shunt resistor 24 is closed and the condenser discharges.

Having thus described my invention, I claim:

1. An input controller comprising a power switch, a relay for operating the switch, a vacuum tube having a grid, said relay being in the output circuit of said tube, means for connecting an A. C. supply to the tube as the output circuit thereof, a timing condenser connected to the grid, means substantially isolated from the A. C. supply for charging the condenser with negative D. C. voltage, means for varying the rate of charging of said condenser, means for discharging said condenser, means for varying the rate of discharge of said condenser to establish a timing cycle for the variation in the negative bias applied to said grid to control the transmission of said tube and the actuation of said relay when the condition of a variable affected by the input controller is at a predetermined point, means for establishing and varying said predetermined point, and means responsive to changes of condition of the variable from said predetermined point for imposing an A. C. control voltage on said grid of substantially the same as or the opposite phase from that of the said A. C. supply to the tube, and of varying amplitude and of phase functional with the change and sense of change of said condition from said predetermined condition in either augmentation or reduction of the D. C. bias applied to said grid to change the cycle of conductive transmission of the tube from that existing when said variable is at said predetermined point.

2. A proportional input controller arranged for operative association with an electric furnace having a temperature-responsive element comprising a circuit for producing an A. C. signal as a function of deviation of the temperature of such furnace from a desired holding point and of one or substantially the opposite phase according to the sense of deviation from such desired holding point, means for actuating a relay for controlling power on and power off to the connections for such furnace in a predeterminedly timed sequence, and means for automatically modifying the predetermined timed sequence by application of such A. C. signal to the means for actuating the relay to change the proportion of power on and power off relations as a substantial function of the deviation from the holding point of such furnace.

3. An input controller comprising a tube, a timing condenser, means for charging the condenser negatively at a determined variable rate from a D. C. source, means for discharging the condenser at a predetermined variable rate, means for impressing the negative charge of the condenser on the grid of the tube connections from an A. C. source substantially isolated from said D. C. source forming the output of said tube, a relay in the output circuit of the tube, means for impressing an A. C. control signal on the grid of said tube of substantially the same phase as or the opposite phase from that of the said A. C. source to modify the negative grid bias on said tube and thus to change the effective cycle of charging and discharging said condenser and thus the effective cycle of tube conduction.

4. An input controller comprising a tube, means for supplying A. C. power to the tube, a relay in the output circuit of the tube, a timing condenser connected to the grid of said tube, means for connection to a D. C. source substantially isolated from the A. C. power for charging the condenser negatively to impress a negative grid bias on said grid, means actuated by the actuated relay for interrupting the negative supply to said condenser, means for bleeding off the charge from said condenser to reduce the negative grid bias in order to cause the tube to conduct, means for predetermining the charging and discharging rates of said condenser so as to establish a predetermined time on for the delay, load controlling means controlled by said relay, and means for impressing an A. C. signal of varying amplitude and of one phase or substantially the opposite phase on the grid of said tube in order to change the time on for the relay in a sense related to that of the phase of said A. C. signal.

5. An input controller for load controlling association with a furnace having a temperature responsive agent comprising a tube having a grid, a timing condenser connected to said grid, an A. C. source forming the tube output, a relay in the output circuit of said tube, means actuated by the relay for actuating the load of such furnace, a switch actuated by said relay, connections for a source of D. C. voltage substantially isolated from the A. C. source, a first variable resistor in series with one of said connections said switch and said condenser for negatively charging said condenser and thus the grid, a second resistor in series with said condenser and the other of said connections for bleeding said condenser to reduce the negative bias on said grid, said resistors when the connections are coupled to said source of D. C. voltage establishing a cycle of on and off for the tube and thus the relay and the actuation of the load, means establishing a control circuit having an A. C. output connected to the grid of said tube and said output comprising no signal or a signal of amplitude proportional to and of one phase or the opposite phase according to the sense of the deviation of such furnace temperature from a holding temperature manifested by the condition of such agent, said signal impressing an A. C. signal on said grid to modify the cycle of time on in the said cycle of time on and time off in said tube and relay substantially proportionally to the deviation of such furnace temperature from such holding point and in a sense related to the sense of such deviation.

6. An input controller comprising a tube, a timing condenser, means for charging the condenser negatively from a substantially isolated D. C. source at a determined rate, means for discharging the condenser at a determined rate, means for impressing the negative charge of the condenser on the grid of the tube as a negative grid bias, a relay in the output circuit of the tube, means for energizing the output circuit of the tube from a given source of A. C., and means for impressing an A. C. signal on the grid of said tube from the said source of A. C. of variable amplitude and of predetermined phase related to that of the said energizing A. C. to change the effective cycle of charging and discharging of said condenser and thus the effective cycle of tube conduction in a sense related to the predetermined phase and in degree functional with the amplitude of said A. C. signal.

7. An input controller comprising a tube, a timing condenser, means for charging the condenser negatively from a substantially isolated D. C. source at a determined rate, means for discharging the condenser at a determined rate, means for impressing the negative charge of the condenser on the grid of the tube as a negative grid bias, a relay in the output circuit of the tube, means for energizing the output circuit of the tube from a given source of A. C., means establishing a bridge circuit, means in the bridge circuit adjustable to establish a balance level datum point, means in the bridge circuit adjustable automatically as a function of the instantaneous temperature condition of a furnace and relative to such datum point, means for energizing the bridge circuit from said source of A. C., and means for impressing an A. C. signal arising from unbalance of said bridge on the grid of said tube to change the effective cycle of charging and discharging of said condenser and thus the effective cycle of tube conduction to proportion the last mentioned cycle to the deviation of such furnace temperature relative to the holding point, and means actuated by the relay for controlling the load of such furnace.

8. An input controller comprising a tube, a timing condenser, a source of D. C., means for charging said condenser negatively from said source at a determined rate, means for varying said rate, means for discharging the condenser at a predetermined rate, means for varying said discharging rate, means for impressing the negative charge of the condenser on the grid of said tube as a negative grid bias, means operated upon conduction of the tube and inoperative during non-conduction of the tube for establishing the discharge of the condenser independent of the charge thereof to establish a fluctuating negative grid bias between a higher negative charge and a lower negative charge at which latter the tube conducts and at which former the tube fails to conduct to establish a time on, time off cycle, means effecting an A. C. plate circuit from a given A. C. source substantially isolated from the D. C. source, and means for impressing an A. C. signal from the same said A. C. source on said grid to change the cycle of conduction of said tube.

9. An input controller comprising a tube, means for energizing the plate circuit of the tube from a source of A. C., a timing condenser coupled to the grid of the tube, means for effecting a fluctuating negative charge from a source of D. C. substantially isolated from said A. C. source simultaneously on said condenser and grid in a timed cycle of fluctuation from a source of D. C. substantially isolated from said A. C. source whereby a timed cycle of on and off for said tube is secured, and means for impressing an additive A. C. signal from said A. C. source on said grid to change the timed cycle of on and off for said tube variable as the signal is in augmentation or reduction of the said negative grid bias.

10. An input controller comprising a tube having a grid, a timing condenser connected to the grid, means establishing a resistive charging path for the condenser, means establishing a resistive bleed path for the condenser, both of said last means being variable to vary the rates respectively of charge and discharge of the condenser, connections for a D. C. source for charging the condenser negatively and applying negative bias to the grid, connections for an A. C. source substantially isolated from the D. C. source for energizing the plate circuit of the tube, relay means operative upon conduction of the tube to control the said resistive paths so as to charge the condenser and grid negatively until the tube stops conducting and operative when the tube stops conducting to discharge the condenser and grid until the negative bias decreases to such a point that the tube again starts conducting, both of said means establishing when fixed combining to establish a time cycle of charge and discharge and therefore of tube conduction and non-conduction, load circuit means controlled by the relay means in a cycle of time on and time off, and means for impressing an A. C. signal of varying amplitude upon the grid of the tube from the said connections for the said source of A. C. to vary the cycle of time on of the circuit means proportionally to the amplitude of the signal.

11. An input controller comprising a tube having a grid, a timing condenser connected to the grid, means establishing a resistive charging path for the condenser, means establishing a resistive bleed path for the condenser, both of said last means being variable to vary the rates respectively of charge and discharge of the condenser, connections for a D. C. source for charging the condenser negatively and applying negative bias to the grid, connections for an A. C. source substantially isolated from the D. C. source for energizing the plate circuit of the tube, relay means operative upon conduction of the tube to control the said resistive paths so as to charge the condenser and grid negatively until the tube stops conducting and operative when the tube stops conducting to discharge the condenser and grid until the negative bias decreases to such a point that the tube again starts conducting, both of said means establishing when fixed combining to establish a time cycle of charge and discharge and therefore of tube conduction and non-conduction, load circuit means controlled by the relay means in a cycle of time on and time off, and means for impressing an A. C. signal of varying amplitude upon the grid of the tube from the said connections for the said source of A. C. to vary the cycle of time on of the circuit means proportionally to the amplitude of the signal, said means for establishing a bleed path for the condenser being permanently connected to establish a constant bleed path regardless of the charging of the condenser.

12. An input controller comprising a tube having a grid, a timing condenser connected to the grid, means establishing a charging path for the condenser, means establishing a bleed path for the condenser, both of said last means being variable to vary the rates respectively of charge and discharge of the condenser, connections for a substantially isolated D. C. source for charging the condenser negatively at a substantially constant rate and applying negative bias to the grid, connections from an A. C. source substantially isolated from the said D. C. source for energizing the plate circuit of the tube, relay means operative upon conduction of the tube to control the said paths so as to charge the condenser and grid negatively from said isolated source until the tube stops conducting and operative when the tube stops conducting to discharge the condenser and grid until the negative bias decreases to such a point that the tube again starts conducting, both of said means establishing when fixed combining to establish a time cycle of charge and discharge and therefore of tube conduction and non-conduction, load circuit means controlled by the relay means in a cycle of time on and time off, and a bridge circuit for impressing an A. C. signal of predeterminedly varying amplitude upon the grid of the tube from the said connections for the said source of A. C. to vary the cycle of time on of the circuit means proportionally to the amplitude of the signal, said means for establishing a bleed path for the condenser being open when the means for establishing a charging path is closed and vice versa in order to make the charge and discharge completely independent functions of the controller.

References Cited in the file of this patent

UNITED STATES PATENTS

| Number | Name | Date |
|---|---|---|
| 1,767,236 | Bock et al. | June 24, 1930 |
| 2,370,287 | Bivins | Feb. 27, 1945 |
| 2,383,806 | Kubler et al. | Aug. 28, 1945 |
| 2,431,284 | Stadum | Nov. 18, 1947 |